S. G. RANDALL.
Hand Seeder.

No. 16,610. Patented Feb. 10, 1857.

UNITED STATES PATENT OFFICE.

SILAS G. RANDALL, OF ROCKFORD, ILLINOIS.

IMPROVEMENT IN SEED-PLANTERS.

Specification forming part of Letters Patent No. 16,610, dated February 10, 1857.

*To all whom it may concern:*

Be it known that I, SILAS G. RANDALL, of Rockford, in the county of Winnebago and State of Illinois, have invented certain new and useful Improvements in Hand Seed-Planters; and I do hereby declare the following to be a full, clear, and exact description of the same, reference being had to the accompanying drawings, making a part thereof, in which—

Figure 1:
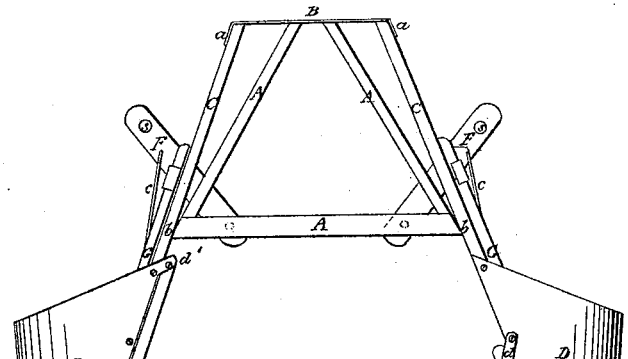
Figure 2:
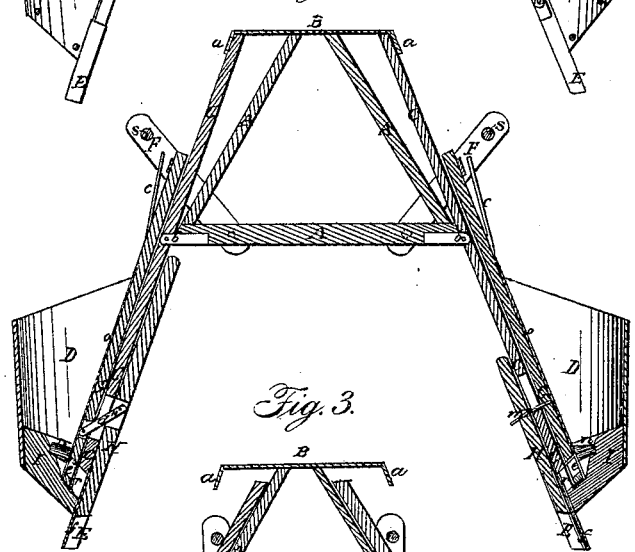
Figure 3:
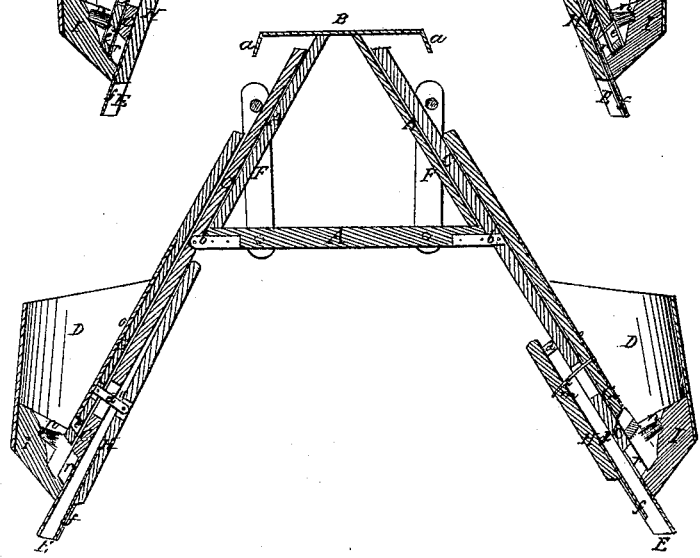

Figure 1 represents a view from one of the sides of the machine. Fig. 2 represents a vertical central section taken through the machine, and Fig. 3 represents the position of the several parts after the machine has been struck into the ground—the hole for the seed opened and the seed ready to pass into said opening.

Similar letters, where they occur in the several drawings, denote like parts in all.

To enable others skilled in the art to make and use my invention, I will proceed to describe the same with reference to the drawings.

A A A represent a light triangular frame with a metallic cap-piece, B, on the apex thereof, which cap-piece has its ends bent downward, as seen at $a$, to form stops for the hinged pieces C, as will be hereinafter explained.

C C are two side pieces, hinged at the points $b\ b$ to the frame A, so as to freely swing on said hinged points to the extent desired. On the lower ends of these side pieces, C, are arranged the seed-hoppers D, for containing the seed to be sown or planted.

To the extreme lower end of the side pieces, C, are fastened the shoes or spades E E, which are three-sided, and made of thin metal, so as to readily penetrate the soil, sod, or other ground in which the seeds are to be deposited.

F F are cranks pivoted to the base of the triangular frame A; and G G are seeding-slides connected to the cranks, respectively, by the connecting-rods $c\ c$, so that in rocking or partially turning said cranks the seeding-slides shall move up and down in contact with the hinged side pieces, C C. The seeding-slides G pass through the hoppers D, and are provided with an opening or cell, $e$, which receives a charge of grain when they are within the hopper, and let it out to pass into the ground after said openings or cells have passed down through the hopper and the opening in the ground made to receive said charge of grain.

H H are spreaders for opening and forming, with the shoes or spades E, a duct or way, as seen in Fig. 3, for the grain to pass down into the hole previously made for its reception. These spreaders H are hinged to the side pieces, C, either by double parallel bars $d\ d$, as seen on the right of the figures, or by a single joint, $d''$, as seen on the left of the figures, either performing practically the same result, though I prefer the former plan with the double parallel bars. The lower ends of these spreaders are provided with a thin sharp-edged plate, $f$, which lies flat and tight up against the broad side of its shoe or spade E, so that when the edge of the shoe is beveled off on one side, and the plate $f$ on the opposite side, the two when close up against each other form, as it were, but one sharp edge or plate to enter the ground, as seen in Fig. 2. Their thickness not increasing in the wedge form, as usual in these machines, they readily follow the first cut of the spade to any desired depth at which the seed are to be deposited, and without any undue effort on the part of the operator, the plates entering the ground as readily as an ordinary blade of a hand-spade would do. This feature is particularly important in these hand-machines, as it enables the user without any injurious exertion to deposit the seed at such depth as their character may require. When these spreaders are hung with the double parallel bars their motion to and from the side pieces, C, would be in parallel lines; but when attached by the single joint, as represented at $d''$, their motion would be in the arc of a circle of which $d''$ is the center. As before stated, either will serve the purpose to be accomplished. The spreaders H are operated respectively by the seed-slides G, with which they act in concert, as follows: A bar or stud, $i$, attached to the seed-slide, passes through a mortise or slot in the side piece, C, (see right-hand side of Figs. 2, 3,) and into a slot, $m$, in the spreader, where it may play loosely. When the seed-slide is raised up the stud $i$ raises upward also the spreader, but the spreader being connected to the side pieces, which are at that time immovable, by the bars $d\ d$, they push the spreader away from the side piece and shoe E, and thence open a duct for the seed to run into and down to the bottom of the opening made for it. When arranged as on the left-hand side of the figures, the stud and one of the bars may be dispensed with, and the single bar $d''$ used instead. In this latter case the bar $d''$, before the seed-slide is raised, is in the position shown in Fig. 2, (left side.) As the seed-slide is raised, the bar $d''$, being thrown into a more horizontal position, as seen in Fig. 3, forces the spreader away from the side piece and shoe, and thus forms a duct or way, tapering upward, instead of uniform width, as in the other described plan; but in both forms the spade or plates, when they enter the ground, are perfectly parallel, and together present but one edge, as it were, to the ground, so that were either to strike against a sod or other hard substance it would cut through it readily, and always insure planting at uniform and proper depths.

I I are the bottoms of the hoppers, in which brushes $n\,n$, or any other flexible or elastic material, is placed to serve as a cut-off to the seed-cells $e$, and keep back the excess of seed over and above that which is contained in the cells $e$, which cells are made adjustable by means of the plates $o\,o$ on the seed-slides and slots and set-screws to move and hold them at any regulated height. $r\,r$ are the openings through which the grain passes from the cells $e$ into the ducts when said openings come opposite to the cells.

$s\,s$ are the handles in the cranks F, which the operator grasps to work the machine.

The operation of the machine is as follows: The several parts being in the positions indicated in Figs. 1 and 2, the operator having hold of the handles $s\,s$, the machine is struck into the ground, the spades entering up to the shoulders on the spreaders or any other gaged depth. The inclination of the pieces C tends, as the machine is struck into the ground, to spread them more at their lower ends. Now, as they are hinged to the frame at $b$, they can do this readily, the tops coming together and the bottoms spreading out until the parts are in the position shown in Fig. 3. This spreading at the bottom opens the cuts made by the spades, and the operator bringing up the cranks F into the position shown in Fig. 3, the pieces H H are forced away from the pieces C C and form a duct or passage for the seed to pass down and into the ground. The spreading of the lower ends of the machine as it is struck into the ground, leaves a space unoccupied by earth behind these lower ends, into which the spreaders are thrown without any resistance by the turning of the cranks F, as above described, and as soon as the spreaders are pushed back, the seed which had been previously deposited in the spaces $r\,r$ by the slides G passes down the duct into the ground, and the machine is raised up and prepared for the next similar operation. The extent of the motion of the side pieces C C is governed by the distance between the flanges $a\,a$ and the frame A, through which space the upper ends of them move.

Having thus fully described the nature of my invention, what I claim therein as new, and desire to secure by Letters Patent, is—

In combination with the shoe or spade composed of the pieces E $f$, the spreading-bars H, arranged and operating in the manner and for the purpose substantially as set forth.

SILAS G. RANDALL.

Witnesses:
A. B. STOUGHTON,
E. COHEN.